Sept. 13, 1960        W. H. NEWTON        2,952,361

MATERIAL SEPARATORS AND FEEDER MEANS THEREFOR

Filed July 2, 1953        2 Sheets-Sheet 1

INVENTOR,
WILLIAM H. NEWTON,
BY

ATT'Y.

INVENTOR;
WILLIAM H. NEWTON,

United States Patent Office 2,952,361
Patented Sept. 13, 1960

2,952,361

MATERIAL SEPARATORS AND FEEDER MEANS THEREFOR

William H. Newton, Blacklick, Ohio, assignor to The Jeffrey Manufacturing Company, a corporation of Ohio Filed July 2, 1953, Ser. No. 365,705

8 Claims. (Cl. 209—232)

This invention relates to material separators such, for example, as magnetic separators, including material feeding means and to feeding means per se for such apparatus.

An object of the invention is, therefore, to provide an improved material separator apparatus including improved feeded means or an improved feeder means per se.

Another object of the invention is to provide improved apparatus as set forth in the foregoing object wherein gravity plays an important role in properly feeding materials to the separator.

Another object of the invention is to provide improved feeder means for a material separator, either per se or in a material separator, wherein material is caused to pass through the feeder at a velocity sufficient to maintain the feeder bottom swept clear of materials that would otherwise lodge therein and interfere with the operation of the feeder.

Another object of the invention is to provide an improved and novel type of feed chamber for a materials separator, which is adapted for use where the materials being handled are abrasive in nature, and in which means are used for trapping a layer of the materials on the bottom of the feed chamber whereby the trapped materials form a liner over which other materials fed into the feed chamber must pass.

Still another object of the invention is to provide an improved separator, including an improved materials feeder, and/or the feeder per se, which is of relatively simple, inexpensive construction and yet constitutes an important step forward in the art of feeding or introducing material into separators and particularly into magnetic separators.

Other objects of the invention will appear hereinafter, the novel features and combinations being set forth in the appended claims.

Figure 1:
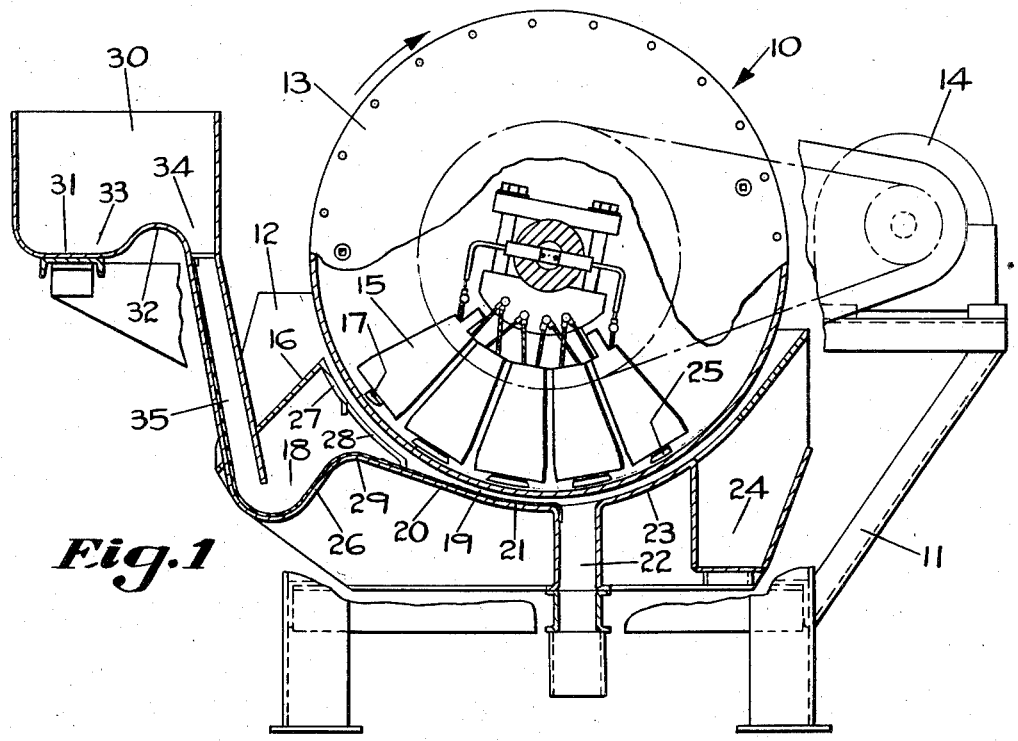
Fig. 1 is a side sectional, elevational view through a magnetic separator embodying features of the invention.

One of the principal, though not exclusive, uses of the magnetic separators shown in the drawings is in recovering magnetic particles of a high gravity separating medium which is employed in a non-magnetic or heavy medium process or method for the separation of non-magnetic materials from gangue.

One well known way of treating non-magnetic ore or coal to separate the values from the gangue is by heavy medium process in a cyclone separator. In one such system including a cyclone separator, raw material, while being fed to the cyclone separator, is mixed with fine particles of magnetic material, such as magnetite or ferrosilicon, or a mixture of the two, and water. In the cyclone separator the materials are separated within the heavy medium into a values product and a gangue product, one of which is a float product and the other of which is a sink product. Both of these products may contain some of the magnetic particles of the heavy medium and each of the products may be treated in one of the magnetic separators shown in the drawings to recover the magnetic particles which may be returned to the cyclone separator by being mixed with the raw materials being fed thereto.

It is to be understood, however, that the above example constitutes only one illustration of the important uses of the separators shown in the drawings and other may occur to those skilled in the art. In fact these separators may be employed in any case where complete removal of all magnetic material from the pulp is desired and in which the solid particles being treated are of sizes, for example, of the order of zero to one-half inch.

Figure 2:
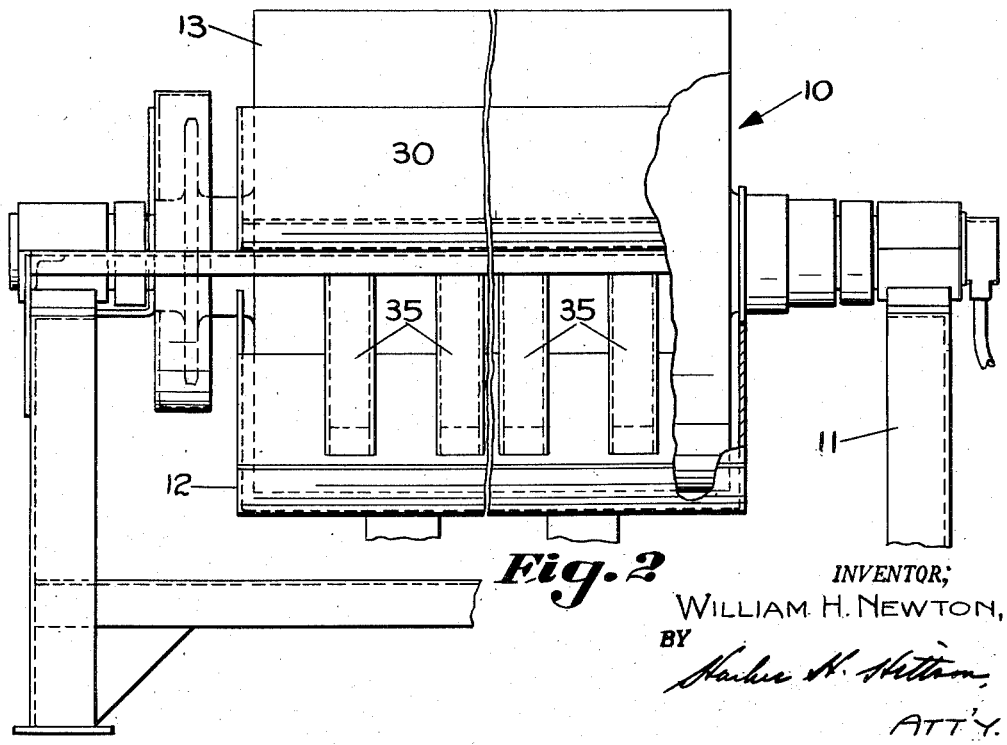
Fig. 2 is a side view in elevation, with portions broken away, of the material separator seen in Fig. 1.

The magnetic separator 10 shown in Figs. 1 and 2 of the drawings, with the exception of the feeder means associated therewith, follows the construction shown and described in my co-pending application, Serial 224,897, filed May 7, 1951, now patent No. 2,675,918, dated April 20, 1954, for a Magnetic Separator and, therefore, only those features of this separator apparatus that are pertinent to this invention are described herein in detail.

Figure 3:
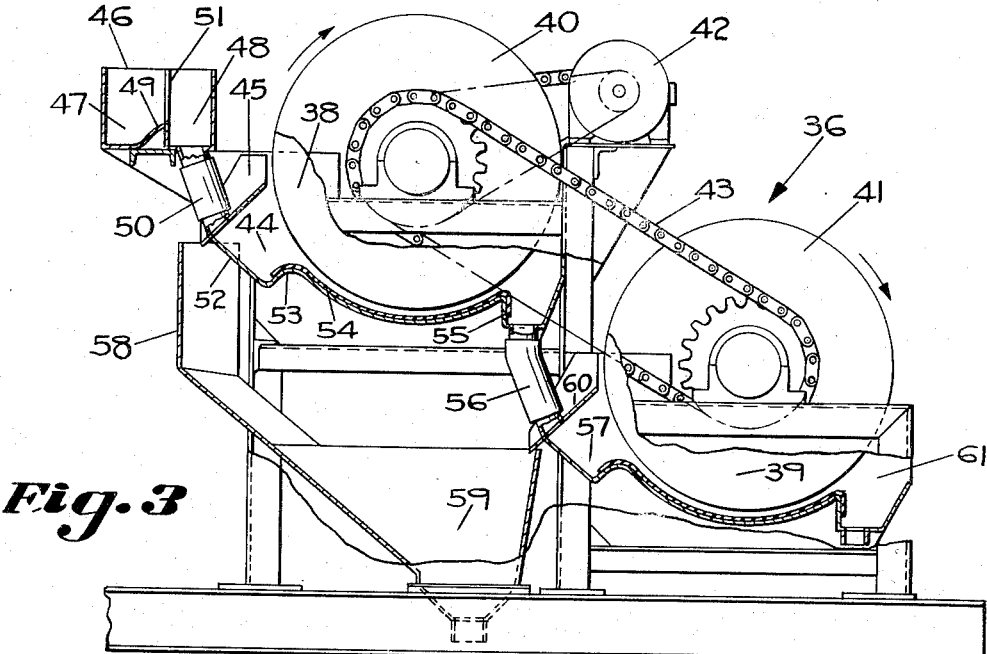
Fig. 3 is a side view in elevation, with portions broken away, of another magnetic separator apparatus including features of the invention, the separator including two material carriers and two feeder apparatuses, one for each magnetic carrier.
Figure 4:
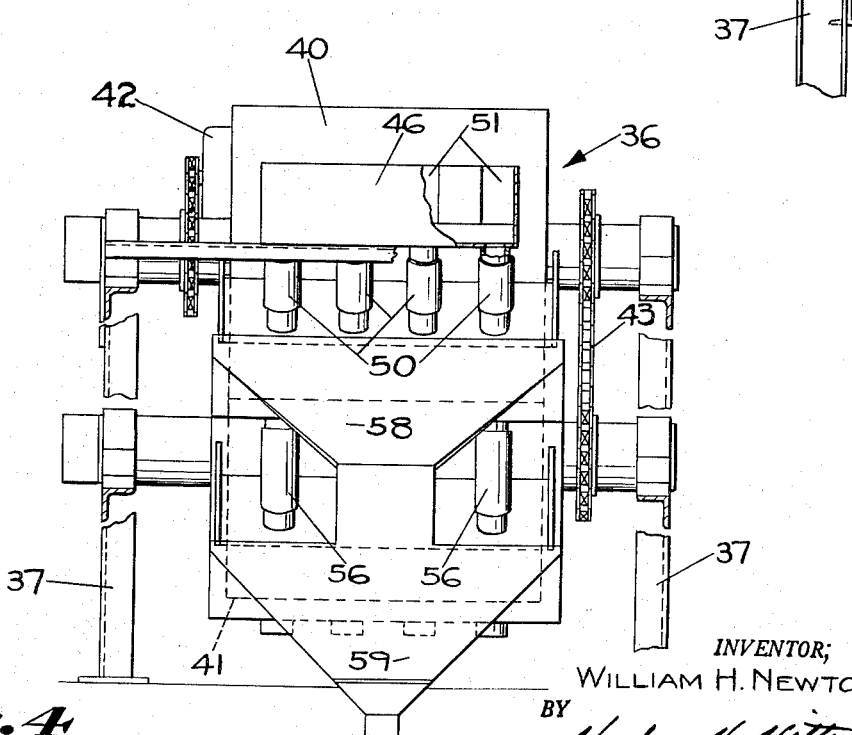
Fig. 4 is a side view in elevation, with portions broken away, of the magnetic separator apparatus seen in Fig. 3.

It may be mentioned here that the separator 10 may be employed with particular advantage in separating materials having the above size range, whereas the separator apparatus shown in Figs. 3 and 4 of the drawings may be employed with advantage to separate materials having a size range of the order of zero to one-eighth inch and at a greater rate of feed.

Separator 10 includes a frame 11 that carries a box or tank, generally designated 12, which has spaced generally upright side walls and a generally cylindrically formed bottom which is made up of a number of elements hereinafter more completely described. Mounted to rotate in the box 12 on a generally horizontal axis and to submerge or extend into fluid contained therein is a non-magnetic carrier in the form of a drum 13 which may be rotated by a drive gearing, including a motor 14, in the direction of the arrow seen in Fig. 1 of the drawings. Within the drum 13 there is a non-rotary or stationary, but adjustable, magnetic assembly 15 which is preferably adjustable about the transverse generally horizontal axis of rotation of the drum 13.

Considering now the various significant elements or structures which are associated with or form portions of the substantially semi-cylindrical bottom of the box 12, the first structure encountered, starting from the left side and moving to the right as viewed in Fig. 1, is a concentrates or magnetic material discharge chute 16, the upper edge of which is closely adjacent the lower outside peripheral surface of the drum 13 and which is located so that magnetic material on the drum 13 adjacent it, after passing out of the influence of the adjacent magnet pole 17 of the magnet assembly 15, will fall upon its upper or top surface. This magnetic material is discharged from the separator by the chute 16 and it may be returned to the raw material being fed to the cyclone separator as above described. A water spray, not shown, may be provided to aid the discharge of magnetic materials from the drum 13 and chute 16.

Closely adjacent and immediately below the discharge chute 16 is a feed chamber 18 in the form of an elongated box, trough, or pocket, that extends transversely of the drum 13 and throughout the full width of the box 12 by which mixed magnetic and non-magnetic materials, which may be called respectively concentrates and tailings, preferably in the form of a liquid or fluid pulp, are fed to adjacent the surface of the rotating drum or carrier 13. The discharge trough or chute 16 and the feed chamber 18, together with their relation to each other, the box 12, and drum or carrier 13, are important to this invention and are further described hereinafter.

The tailings pulp flowing from the feed chamber or trough 18 is formed into a relatively thin or shallow stream by a passageway 19 which is preferably relatively long and has a relatively low height. Passageway 19 is formed by the side walls of box 12, the lower portion of the outer peripheral surface of the drum or carrier 13 and an adjacent curved surface provided in part by a curved plate 20 of the box 12 which is of non-magnetic material. The upper surface of the bottom plate 20 is preferably protected by a covering 21 formed of rubber or the like to prevent undue wear on the plate 20 by reason of the abrasive action of the tailings pulp.

Adjacent the bottom edge of the plate 20 and generally in a vertical upright plane which passes through the drum 13 there is a spigot discharge chamber 22 which is adapted to receive the coarse tailings and discharge them through a bottom discharge opening which is of sufficient size to pass the large size particles of the tailings, but not open enough to discharge all the pulp. It is to be noted that the spigot discharge chamber 22 is located adjacent the drum or carrier 13 between the extremities of the magnet assembly 15 as a consequence of which the fine tailings pulp will continue to flow through the restricted passageway 19, and over a bottom plate 23 to a tailings or pulp discharge trough or chamber 24 located adjacent the other end pole 25 of the magnet assembly 15. The weir formed by the lower top edge of the chamber 24 is located below the upper edge of the discharge chute 16 and as a consequence the tailings pulp will flow from the feed chamber or trough 18 to the discharge chamber 24 from which it is discharged from the separator.

Materials in the form of a pulp consisting of magnetic particles, non-magnetic particles and water are introduced into the box 12 and to the drum or carrier 13 in an entirely novel manner through a novel feeder apparatus including the trough or pocket 18. It will be seen from Fig. 1 of the drawings that the bottom 26 of trough or pocket 18 is formed as an upwardly sloping or inclined smooth ogee curve that merges with or is faired into the bottom curved plate 20 of box 12. Bottom 26 is attached to and closed at its opposite ends by the upright sidewalls of box 12. The box, trough or pocket 18, is covered by the discharge chute 16 which latter is formed to include a curved portion 27 which, in effect, forms a continuation of the passageway 19 leading to the top of the discharge chute 16 and through which magnetic material is conveyed by the carrier 13. Portion 27 of the chute 16 is cut out as at 28 to form an opening immediately above the discharge side or edge 29 of the trough or pocket 18 adjacent the drum or carrier 13 which extends substantially throughout the full width of the latter and parallel thereto and over which materials must pass to reach the carrier 13 and the elongated passageway 19.

A materials receiving container, box or distributor 30 is carried by the frame 11 at an elevation above the troughs 16 and 18. The bottom 31 of this box is shaped to form a weir or dam 32 which divides the elongated container 30 into a materials receiving side or trough 33 and a distributor side or trough 34. The material distributor trough 34 is connected to the elongated box, trough or pocket 18 by a plurality of generally upright sloping or slanted feed chutes or conduits 35 that pass through the discharge chute 16 and terminate adjacent the bottom of the feed chamber 18. Chutes or conduits 35 are sealed, as by welding, to the chute 16 where they pass therethrough. These chutes or conduits 35 are preferably spaced along the length of the distributor trough 34 and the trough 18 to provide an even distribution of materials to the latter throughout its length. The covering 21 protects the entire bottom 26 of the trough 18 and extends upwardly into the chutes or conduits 35 to protect them from abrasion.

In the operation of separator 10 mixed materials including magnetic and non-magnetic particles together with water are fed into the materials receiving trough 33 of receptacle 30, and after trough 33 has become filled the mixed materials flow or spill over the weir or dam 32 into the material distributing trough 34 which distributes the materials uniformly between the feed chutes or conduits 35. Upon entering feed chutes 35 the materials are accelerated by gravity and enter the feed chamber 18 at a relatively high velocity which, of course, causes them to follow and sweep or slide upwardly on the smooth ogee shaped bottom 26 of the trough or chamber 18 and through the opening 28 to the drum or carrier 13. Some of the materials and substantially all of the water fed into the trough or chamber 18 will, upon passing through the opening 28, flow through the passageway 19 counter to or in a direction opposite to the direction of rotation of carrier 13, and, of course, into the magnetic fields of the adjacent poles of magnet assembly 15. Magnetic materials which enter the passageway 19 are, of course, attracted to the drum or carrier 13 and are carried upwardly thereby to be discharged or released upon the discharge chute 16.

It is important to note that because the materials being fed into the feed chamber or trough 18 enter it at a relatively high velocity the materials follow the ogee shape of the bottom 26 to sweep it clear of any particles thereof that might tend to settle or lodge therein and stop, plug, or otherwise interfere with the operation of the feeder apparatus. During the operation of separator 10 the drum 13 is rotating in the direction of the arrow seen in Fig. 1 and the magnetic materials conveyed thereby are carried upwardly and when they pass from the magnetic field of the last pole 17 of said magnet assembly 15 they fall upon the top surface of discharge chute 16 by which they are discharged from the separator 10. It will be seen, of course, that this magnetic material in passing over the discharge chute 16 will flow between the spaced chutes or conduits 35 where the latter pass through the discharge chute or trough 16.

The non-magnetic pulp or tailings flows through the passageway 19 in a direction opposite that in which the drum or carrier 13 is rotating. The larger particles of this pulp are removed from the separator 10 through the coarse tailings spigot 22 and the smaller particles continue through the passageway 19 over the plate 23 and are discharged from the separator 10 through the discharge chamber 24.

As above mentioned, the material separator 36 shown in Figs. 3 and 4 of the drawings may be used with advantage in separating materials wherein the size range is from zero to one-eighth inch and wherein the feed volume is relatively large. This separator includes a frame 37 that supports two boxes or tanks 38 and 39 of non-magnetic material. A pair of drums or carriers 40 and 41 are mounted to rotate upon generally horizontally spaced axes so that they submerge in the fluid in the tanks 38 and 39 respectively. Each of the drums or carriers 40 and 41 is similar in construction to the drum 13 previously described and each contains a magnet assembly, not shown, similar to the magnet assembly 15. Drum or carrier 40 is rotated through a chain and sprocket drive from a motor 42, and it in turn is connected through sprockets and a chain 43 to drive the drum or carrier 41. The directions of rotation of drums 40 and 41 are indicated by arrows in Fig. 3 of the drawings. Tanks 38 and 39 are substantially duplicate structures and they differ from the previously described tank 12 essentially only in that neither of them is provided with a coarse tailings spigot similar to spigot 22.

Separator apparatus 36 includes two material feeders that are of different construction than the feeder described in connection with the separator 10. It is to be understood, however, that the material feeders of apparatus 36 may be applied to the separator 10 and vice versa, if desired.

The feeder apparatus for tank 38 and drum or carrier 40 includes a feed chamber 44 in the form of an elongated box, trough, or pocket, that extends transversely of the drum or carrier 40 and has its ends formed by the upright side walls of frame 37. The top of the feed chamber 44 is covered by a magnetic materials discharge chute or trough 45 which receives magnetic material from the drum 40.

A materials receiving container, box, or distributor 46 is carried by the main frame 38 at an elevation above the troughs 45 and 44. Box 46 is divided into a materials receiving trough 47 and a materials distributing trough 48 by a weir or dam 49 which is an integral part of the bottom of the box. A plurality of spaced generally upright chutes or conduits 50 are distributed throughout the length of distributor trough 48 which connect the distributor trough 48 with the feed chamber trough 44 therebelow by leading through the discharge chute 45 to which they are connected. It is to be noted that there is essentially only on difference between the material receiving box 30 and the box 46, namely, the box 46 includes a plurality of upwardly extending spaced baffle plates 51 which extend generally upwardly from the top of weir or dam 49. One of these baffle plates 51 is located directly between each of the inlet openings of the upright chutes or conduits 50 and the receiving trough 47 in order that materials cannot pass directly over the weir or dam 49 and into the chutes 50 but must enter the distributor trough 48 between the chutes 50 and then be distributed laterally by the distributor trough to reach the chutes 50.

As seen in Fig. 3 of the drawings the feed chamber 44 is relatively shallow and its bottom 52 forms a generally V-shaped trough having an upwardly sloping or inclined side that merges into a rounded discharge side or edge 53 adjacent the drum or carrier 40. A covering 54 of rubber or the like covers the bottom of the tank 38 and extends over the rounded discharge side or edge 53 of trough 44.

The feeder for tank 39 and drum or carrier 41 is identical in all respects to the feeder apparatus described for box or tank 38 and drum or carrier 40 except that its distributor box is formed by the tailings discharge chute 55 which feeds tailings from the box or tank 38 into a plurality of generally upright spaced chutes or conduits 56 that convey the tailings into the feed chamber box, or pocket 57, through which the tailings are fed into the tank 39 and to the drum or carrier 41 therein.

In the operation of separator apparatus 36 with the drums or carriers 40 and 41 rotating in the direction of the arrows seen in Fig. 3 of the drawings, materials to be separated are fed into the materials receiving trough 47 of container 46 from which they pass over the weir or dam 49 between the spaced baffle plates 51 and into the distributing trough 48 and laterally into chutes or conduits 50 through which they pass downwardly under the influence of gravity which increases their velocity. It will be seen that because the bottom 52 of trough 44 includes a relatively sharp longitudinally extending bottom corner which extends parallel with respect to the axis of drum 40 that some of the materials being fed through the trough 44 from the chutes or conduits 50 will lodge or be trapped in the bottom of the trough 44 and that materials entering the trough thereafter, due to their velocity, will sweep across the lodged or trapped materials in the bottom of the trough 44 and be directed thereby to pass over the sloping side and discharge edge 53 of trough 44. This feeder construction may be used with particular advantage where the materials being handled are abrasive in nature because the pocketed or trapped materials in the trough 44 form a protecting liner for the bottom of the trough out of the materials being fed therethrough.

Most of the magnetic materials will be separated from the tailings in the tank 38 and will be conveyed therefrom by the drum or carrier 40 and be deposited upon the magnetic materials discharge chute 45 from which they pass, through a chute 58, into a hopper 59 positioned below tank 38. The tailings discharged from tank 38 will be distributed by the tailings discharge trough or chute 55 into the chutes or conduits 56 from which they pass into and through the feeder chamber, box, trough, or conduit 57, and to the drum or carrier 41 in tank 39. Any magnetic materials passing into tank 39 with the tailings from tank 38 will be separated from the tailings by drum or carrier 41 and deposited upon the magnetic materials discharge trough or chute 60 thereabove which feeds them into the hopper 59 from which they may be returned to the cyclone separator, as above described. Tailings free of magnetic particles are discharged from the separator 36 through a tailings discharge chute 61.

From the foregoing it will be seen that I have provided improved separators including improved feeder means wherein the materials being fed, by reason of their velocity, sweep or flush particles of material therefrom which might tend to interfere with the operation of the feeder and that in providing such a feeder I also provide a feeder that is protected from the abrasive action of materials flowing therethrough by intentionally trapping in the feeder a limited quantity of the materials being fed therethrough, which trapped materials form a protective lining or covering for the bottom of the feeder, and the thickness and contour of which is properly maintained by materials flowing through the feeder.

Obviously those skilled in the art may make various changes in the details and arrangements or parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a magnetic separator including a movable nonmagnetic carrier, magnet means above said carrier and a tank adapted to hold water into which said carrier submerges, a feeder means adjacent one side of said tank for feeding materials thereinto and to said carrier, said feeder including means forming a trough having a side extending transversely of said carrier adjacent the latter and over which materials pass to reach said carrier, chute means forming the top of said trough for discharging magnetic materials conveyed thereto by said carrier, a plurality of generally upright spaced conduit means leading through said discharge chute means and to said trough means for feeding materials into the latter by gravity, a material receiving container above said trough means, weir means dividing said container into a material receiving trough and a distributor trough over which materials pass to reach said distributor trough, said distributor trough distributing materials between said generally upright conduit means, and means directing materials passing over said weir means into said distributing trough between said generally upright conduit means.

2. In a magnetic separator including a movable nonmagnetic carrier, magnet means above said carrier and a tank adapted to hold water into which said carrier submerges, a feeder means adjacent one side of said tank for feeding materials thereinto and to said carrier, said feeder including means forming a trough having a side extending transversely of said carrier adjacent the latter and over which materials pass to reach said carrier, chute means forming the top of said trough for discharging magnetic materials conveyed thereto by said carrier, a plurality of generally upright spaced conduit means leading through said discharge chute means and to said trough means for feeding materials into latter by gravity, a material receiving container above said trough means and weir means dividing said container into a material receiving trough and a distributor trough over which materials pass to reach said distributor trough, said distributor trough distributing materials between said generally upright conduit means.

3. In a magnetic separator including a movable nonmagnetic carrier, magnet means above said carrier and a tank adapted to hold water into which said carrier submerges, a feeder means adjacent one side of said tank for feeding materials thereinto and to said carrier, said feeder including means forming a trough having a side extending transversely of said carrier adjacent the latter and over which materials pass to reach said carrier, chute means forming the top of said trough for discharging magnetic materials conveyed thereto by said carrier, a plurality of generally upright spaced conduit means leading through said discharge chute means and to said trough means for feeding material into the latter by gravity, and material distributing means above said trough for distributing materials to said generally upright conduit means.

4. In a magnetic separator including a movable carrier and a tank adapted to hold water into which said carrier submerges, a feeder means adjacent one side of said tank for feeding materials thereinto and to said carrier, said feeder including means forming a trough having a side extending transversely of said carrier adjacent the latter and over which materials pass to reach said carrier, chute means forming the top of said trough for discharging magnetic materials conveyed thereto by said carrier, a plurality of generally upright spaced conduit means leading through said discharge chute means and to said trough means for feeding materials into the latter by gravity, and material distributing means above said trough for distributing materials to said generally upright conduit means.

5. In a magnetic materials separator having a carrier disposed in a tank and a feed chamber opening into the tank and located adjacent the carrier for feeding materials to the carrier surface, said feed chamber extending substantially the full width of the carrier, downwardly directed means for delivering materials by flow of the materials to the feed chamber, said feed chamber including a guiding surface for the materials leading to the carrier and over which the materials are directed to the surface of the carrier, said guiding surface continuing from the delivering means to receive the materials from the delivering means, said guiding surface being formed with a curved surface portion leading downwardly from the delivering means in a smooth curve and having a continuing curved surface portion curving upwardly and away from the delivering means towards the carrier, said materials discharging into the feed chamber onto the curved surface portion of the guiding surface leading downwardly from the delivering means and flowing over the guiding surface in the feed chamber in a path leading to the carrier surface.

6. In a magnetic materials separator having a carrier disposed in a tank and a feed chamber opening into the tank and located adjacent the carrier for feeding materials to the carrier surface, said feed chamber extending substantially the full width of the carrier, means for delivering materials to the carrier comprising a feed box, a chute leading downwardly from the feed box to the feed chamber, said feed chamber including a guiding surface leading to the carrier and over which materials are directed to the carrier, said guiding surface continuing from the chute to receive the materials from the chute, said guiding surface being formed with a curved surface portion leading downwardly from the chute in a smooth curve and having a continuing curved surface portion curving upwardly and away from the chute towards the carrier, said materials discharging from the chute onto the curved surface portion of the guiding surface leading downwardly from the chute and flowing over the guiding surface through the feed chamber in a path leading to the carrier surface.

7. In a magnetic materials separator having a carrier disposed in a tank and a feed chamber opening into the tank and located adjacent the carrier for feeding materials to the carrier, said feed chamber extending substantially the full width of the carrier, means for delivering materials comprising a chute leading downwardly to the feed chamber, said feed chamber including a guiding surface leading to the carrier and over which materials are directed to the carrier, said guiding surface continuing from the chute to receive the materials from the chute, said guiding surface being formed with a curved surface portion leading downwardly from the chute and having a continuing curved surface portion curving upwardly and away from the chute towards the carrier, said materials discharging from the chute onto the curved surface portion of the guiding surface leading downwardly from the chute and flowing over the guiding surface through the feed chamber in a path leading to the carrier surface.

8. In a magnetic materials separator having a carrier disposed in a tank and a feed chamber opening into the tank and located adjacent the carrier for feeding materials to the carrier surface, said feed chamber extending substantially the full width of the carrier, downwardly directed means for delivering materials by flow of the materials to the feed chamber, said feed chamber including a guiding surface for the materials leading to the carrier over which the materials are directed to the surface of the carrier, said guiding surface continuing from the delivering means to receive the materials from the delivering means, said guiding surface being formed with a curved surface portion leading downwardly from the delivering means in a smooth curve and having a continuing curved surface portion curving upwardly and away from the delivering means towards the carrier, a curved surface adjacent the carrier oppositely curved with respect to the guiding surface and merged with and forming a continuation of the guiding surface, said materials discharging into the feed chamber onto the curved surface portion of the guiding surface leading downwardly from the delivering means and flowing over the guiding surface in a path leading to the carrier and being directed over the oppositely curved surface to the carrier surface.

References Cited in the file of this patent
UNITED STATES PATENTS

| 385,551 | Gould | July 3, 1888 |
| 946,394 | Ohrn | Jan. 11, 1910 |
| 1,104,299 | Huelsdonk | July 21, 1914 |
| 1,111,217 | Cole | Sept. 22, 1914 |
| 2,160,628 | Steffensen | May 30, 1939 |
| 2,471,911 | Stearns | May 31, 1949 |
| 2,597,561 | Blind | May 20, 1952 |
| 2,607,478 | Newton | Aug. 19, 1952 |
| 2,695,709 | Stearns | Nov. 30, 1954 |